United States Patent
Bhangu et al.

(10) Patent No.: US 12,438,780 B2
(45) Date of Patent: *Oct. 7, 2025

(54) SYSTEM AND METHOD FOR DRAINING OF O-Cloud NODE

(71) Applicants: RAKUTEN MOBILE, INC., Tokyo (JP); Rakuten Symphony, Inc., Tokyo (JP)

(72) Inventors: Manmeet Singh Bhangu, Andaman and Nicobar Islands (IN); Pankaj Tanaji Shete, Tokyo (JP); Mohit Luthra, Tokyo (JP); Awn Muhammad, Tokyo (JP); Puneet Devadiga, Tokyo (JP)

(73) Assignees: RAKUTEN MOBILE, INC., Tokyo (JP); RAKUTEN SYMPHONY, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/270,902

(22) PCT Filed: Jun. 2, 2023

(86) PCT No.: PCT/US2023/024230
§ 371 (c)(1),
(2) Date: Jul. 5, 2023

(87) PCT Pub. No.: WO2023/235536
PCT Pub. Date: Dec. 7, 2023

(65) Prior Publication Data
US 2024/0388503 A1    Nov. 21, 2024

(30) Foreign Application Priority Data
Jun. 3, 2022 (SG) .............................. 10202250033J

(51) Int. Cl.
G06F 15/173 (2006.01)
H04L 41/0897 (2022.01)
H04L 41/342 (2022.01)

(52) U.S. Cl.
CPC ........ H04L 41/0897 (2022.05); H04L 41/342 (2022.05)

(58) Field of Classification Search
CPC .......................... H04L 41/342; H04L 41/0897
See application file for complete search history.

(56) References Cited

U.S. PATENT DOCUMENTS

2021/0258866 A1*  8/2021  Chou ................... H04W 48/16
2023/0033886 A1*  2/2023  Goswami .............. H04L 43/20

FOREIGN PATENT DOCUMENTS

WO  WO-2022221260 A1 *  4/2022
WO  2024/205618 A1    10/2024

OTHER PUBLICATIONS

International Search Report dated Sep. 19, 2023 in International Application No. PCT/US2023/024230.

(Continued)

*Primary Examiner* — Yves Dalencourt
(74) *Attorney, Agent, or Firm* — Sughrue Mion, PLLC

(57) ABSTRACT

Provided are a method, system, and an Service Management and Orchestration Framework (SMO) and O-Cloud to drain one or more O-Cloud Nodes based on recommendations from an rApp or manually by an O-Cloud Maintainer via the SMO. In particular, the method may include: receiving, by a SMO function, a first request or recommendation to drain at least one O-Cloud Node, the first request or recommendation being received from an rApp of a Non-Real-Time (Non-RT) RAN Intelligent Controller (RIC) or from an O-Cloud Maintainer; transmitting, by the SMO function to an Infrastructure Management Services (IMS) and/or Deployment Management Services (DMS) via an O2 inter- (Continued)

face, a second request to drain the at least one O-Cloud Node based on the received first request or recommendation; and receiving, from the IMS/DMS, a first notification as to whether the at least one O-Cloud Node has been drained.

20 Claims, 6 Drawing Sheets

(56) References Cited

OTHER PUBLICATIONS

Written Opinion dated Sep. 19, 2023 in International Application No. PCT/US2023/024230.
Muhammad Awn, "O-RAN Working Group 6 (Cloudification and Orchestration Workgroup) Study on O-Cloud Energy Savings", O-RAN Alliance, O-RAN.WG6.O-Cloud Energy Savings.v01 00, 2022, pp. 1-29 (29 pages total).
Joan Triay, "O-RAN Working Group 6 O2dms Interface Specification: Profile based on ETSI NFV Protocol and Data Models", O-RAN Alliance, O-RAN.WG6.O2DMS-INTERFACE ETSI-NFV-PROFILE-v01.00, 2022, pp. 1-50 (50 pages total).
"O-RAN 02 Interface General Aspects and Principles", O-RAN Alliance, O-RAN.WG6.02-GA&P-v01.02, 2022, pp. 1-41 (42 pages total).

* cited by examiner

SYSTEM AND METHOD FOR DRAINING OF O-Cloud NODE

CROSS REFERENCE TO RELATED APPLICATIONS

This application is a National Stage of International Application No. PCT/US2023/024230 filed Jun. 2, 2023, claiming priority based on Singapore patent Application No. 10202250033J filed Jun. 3, 2022.

FIELD

System and methods consistent with example embodiments of the present disclosure relate to draining an open radio access network (O-RAN) cloud (O-Cloud) Node.

BACKGROUND

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical Node for hosting Radio Resource Control (RRC), Service Data Adaptation Protocol (SDAP), and/or Packet Data Convergence Protocol (PDCP) sublayers of the RAN. The DU is a logical Node hosting Radio Link Control (RLC), Media Access Control (MAC), and Physical (PHY) sublayers of the RAN. The RU is a physical Node that converts radio signals from antennas to digital signals that can be transmitted over the FrontHaul to a DU. Because these entities have open protocols and interfaces between them, they can be developed by different vendors.

FIG. 1 illustrates a related art O-RAN architecture. Referring to FIG. 1, RAN functions in the O-RAN architecture are controlled and optimized by a RIC. The RIC is a software-defined component that implements modular applications to facilitate the multivendor operability required in the O-RAN system, as well as to automate and optimize RAN operations. The RIC is divided into two types: a non-real-time RIC (Non-RT RIC) and a near-real-time RIC (Near-RT RIC).

The Non-RT RIC is the control point of a non-real-time control loop and operates on a timescale greater than 1 second within the Service Management and Orchestration (SMO) framework. Its functionalities are implemented through modular applications called rApps (rApp 1, . . . , rApp N), and include: providing policy based guidance and enrichment across the A1 interface, which is the interface that enables communication between the Non-RT RIC and the Near-RT RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., Near-RT RIC, O-RAN centralized Unit (O-CU), O-RAN Distributed Unit (O-DU), etc.).

The Near-RT RIC operates on a timescale between 10 milliseconds and 1 second and connects to the O-DU, O-CU (disaggregated into the O-CU control plane (O-CU-CP) and the O-CU user plane (O-CU-UP)), and an open evolved NodeB (O-eNB) via the E2 interface. The Near-RT RIC uses the E2 interface to control the underlying RAN elements (E2 Nodes/network functions (NFs)) over a near-real-time control loop. The Near-RT RIC monitors, suspends/stops, overrides, and controls the E2 Nodes (O-CU, O-DU, and O-eNB) via policies. For example, the Near-RT sets policy parameters on activated functions of the E2 Nodes. Further, the Near-RT RIC hosts xApps to implement functions such as quality of service (QOS) optimization, mobility optimization, slicing optimization, interference mitigation, load balancing, security, etc. The two types of RICs work together to optimize the O-RAN. For example, the Non-RT RIC provides, over the A1 interface, the policies, data, and AI/ML models enforced and used by the Near-RT RIC for RAN optimization, and the Near-RT returns policy feedback (i.e., how the policy set by the NON-RT RIC works).

The SMO framework, within which the Non-RT RIC is located, manages and orchestrates RAN elements. Specifically, the SMO includes the Federated O-Cloud Orchestration and Management (FOCOM), a Network Function Orchestrator (NFO) that manages Virtual Machines (VM) based Virtual Network Functions (VNF) and container (i.e., instance) based VNF, and the OAM as a part of the SMO that manages and orchestrates what is referred to as the O-RAN Cloud (O-Cloud). The O-Cloud is a collection of physical RAN Nodes that host the RICs, O-CUs, and O-DUs, the supporting software components (e.g., the operating systems and runtime environments), and the SMO itself. In other words, the SMO manages the O-Cloud from within. The O2 interface is the interface between the SMO and the O-Cloud it resides in. Through the O2 interface, the SMO provides Infrastructure Management Services (IMS) and Deployment Management Services (DMS). The O2 interface may also send O2 telemetry data to the SMO, e.g., O-Cloud configuration or any logical function data, energy consumption, health status of Node, etc.

In the related art, the O-Cloud resources may need to be optimized in order to eliminate waste of O-cloud resources. In particular, a certain O-cloud Node made encounter performance issues, be idle, or may have signs that it will fail in the future. Accordingly, there is a need to be able to be able to anticipate O-cloud Node failures and proactively manage O-Cloud resources accordingly (e.g., by selecting, provisioning, and rightsizing the resources within the O-Cloud).

SUMMARY

Example embodiments of the present disclosure provide a method and system for the SMO and O-Cloud to drain one or more O-Cloud Nodes based on recommendations from an rApp or manually by an O-Cloud Maintainer via the SMO. In particular, draining O-Cloud Node(s) will mark the O-Cloud Node(s) as cordoned, or unschedulable. Accordingly, it may necessitate the means to relocate, migrate, or terminate Network Functions or components of the Network Functions to another O-Cloud Node. According to embodiments, the request to drain the O-Cloud Node(s) may be based on a recommendation (for example, based on metric data). Accordingly, embodiments of the present disclosure may eliminate waste of O-cloud resources, as well as anticipate O-cloud Node failures and proactively manage O-Cloud resources accordingly.

According to an embodiment, a method for draining one or more Open Radio Access Network (O-RAN) Cloud (O-Cloud) Nodes may be provided. The method may include: receiving, by a Service Management and Orchestration Framework (SMO) function, a first request or recommendation to drain at least one O-Cloud Node, the first request or recommendation being received from an rApp of a Non-Real-Time (Non-RT) RAN Intelligent Controller (RIC) or from an O-Cloud Maintainer; transmitting, by the SMO function to an Infrastructure Management Services (IMS) and/or Deployment Management Services (DMS) via an O2 interface, a second request to drain the at least one O-Cloud Node based on the received first request or recommendation; and receiving, from the IMS/DMS, a first notification as to whether the at least one O-Cloud Node has been drained, wherein the SMO function is at least one of a Federated O-Cloud Orchestration and Management (FOCOM) and Network Function Orchestration (NFO).

According to an embodiment, the second request may be an instruction to drain a first O-Cloud Node of the at least one O-Cloud Node, wherein the first notification indicates that the first O-Cloud Node has been drained, and wherein the method further comprises: transmitting, by the SMO function to the IMS/DMS via the O2 interface, a third request to drain a second O-Cloud Node of the at least one O-Cloud Node based on the received first request or recommendation.

According to an embodiment, the first request or recommendation may be based on metric and/or observability data received by the rApp or the O-Cloud Maintainer via O1- and/or O2-related services.

According to an embodiment, the second request may be transmitted by the SMO function to the IMS/DMS based on determining, by the SMO function, to accept the first request or recommendation to drain the at least one O-Cloud Node.

According to an embodiment, the first notification may indicate that the at least one O-Cloud Node was not drained or an exception occurred.

According to an embodiment, the first notification may indicate that the at least one O-Cloud Node was drained, and wherein the receiving the first notification comprises: receiving, from the IMS/DMS by the SMO function via the O2 interface, the first notification that the at least one O-Cloud Node has been drained.

According to an embodiment, the method may further include notifying, by the SMO function, the rApp of the Non-RT RIC or the O-Cloud Maintainer that the at least one O-Cloud Node has been drained.

According to an embodiment, an apparatus for draining one or more Open Radio Access Network (O-RAN) Cloud (O-Cloud) Nodes may be provided, The apparatus may include: at least one memory storing computer-executable instructions; and at least one processor configured to execute the computer-executable instructions to: receive, by a Service Management and Orchestration Framework (SMO) function, a first request or recommendation to drain at least one O-Cloud Node, the first request or recommendation being received from an rApp of a Non-Real-Time (Non-RT) RAN Intelligent Controller (RIC) or from an O-Cloud Maintainer; transmit, by the SMO function to an Infrastructure Management Services (IMS) and/or Deployment Management Services (DMS) via an O2 interface, a second request to drain the at least one O-Cloud Node based on the received first request or recommendation; and receive, from the IMS/DMS, a first notification as to whether the at least one O-Cloud Node has been drained, wherein the SMO function is at least one of a Federated O-Cloud Orchestration and Management (FOCOM) and Network Function Orchestration (NFO).

According to an embodiment, the second request may be an instruction to drain a first O-Cloud Node of the at least one O-Cloud Node, wherein the first notification indicates that the first O-Cloud Node has been drained, and wherein the at least one processor is further configured to execute the computer-executable instructions to: transmit, by the SMO function to the IMS/DMS via the O2 interface, a third request to drain a second O-Cloud Node of the at least one O-Cloud Node based on the received first request or recommendation. The first request or recommendation may be based on metric and/or observability data received by the rApp or the O-Cloud Maintainer via O1- and/or O2-related services.

According to an embodiment, the second request may be transmitted by the SMO function to the IMS/DMS based on determining, by the SMO function, to accept the first request or recommendation to drain the at least one O-Cloud Node.

According to an embodiment, the first notification may indicate that the at least one O-Cloud Node was not drained or an exception occurred.

According to an embodiment, a first notification may indicate that the at least one O-Cloud Node was drained, and wherein the at least one processor is further configured to execute the computer-executable instructions to receive the first notification by: receiving, from the IMS/DMS by the SMO function via the O2 interface, the first notification that the at least one O-Cloud Node has been drained.

According to an embodiment, the at least one processor may be further configured to execute the computer-executable instructions to: notifying, by the SMO function, the rApp of the Non-RT RIC or the O-Cloud Maintainer that the at least one O-Cloud Node has been drained.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1:
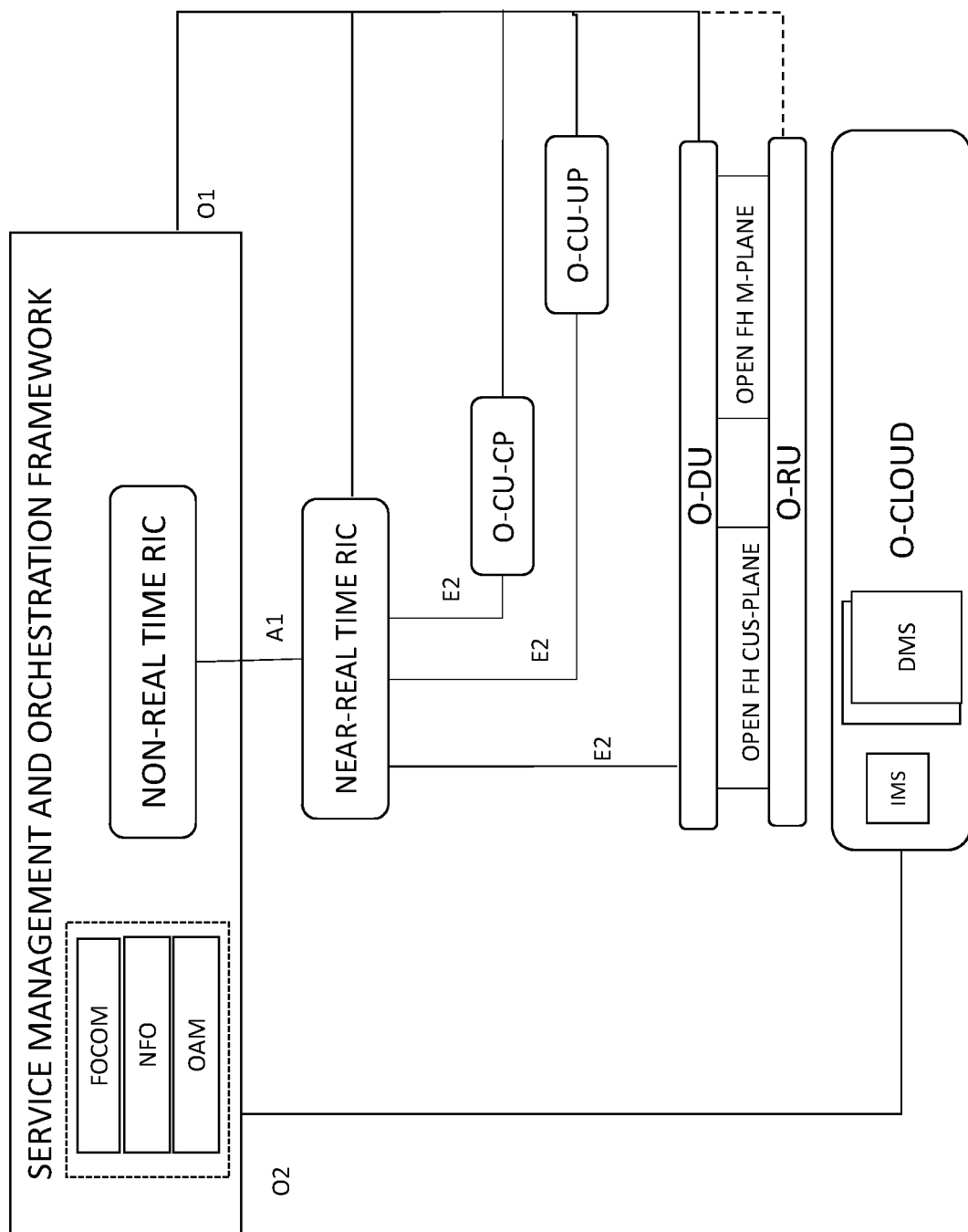
FIG. 1 illustrates an O-RAN architecture according to the related art.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments are directed to O-Cloud resource optimization, which is a process of utilizing O-Cloud resources in an efficient manner and eliminating waste of O-Cloud resources by selecting, provisioning, and rightsizing the resources within the O-Cloud. In accordance with example embodiments, Network Functions (NFs) within the O-Cloud are orchestrated as VNFs/CNFs. The SMO (NFO, FOCOM) handles the management and orchestration of VNFs/CNFs and underlying O-Cloud infrastructure. The SMO's management, orchestration, and optimization functionalities can be enhanced in accordance with example embodiments by intelligent observability analysis from VNFs/CNFs and O-Cloud.

The Non-RT RIC hosts third-party applications such as rApps in the SMO, which can collect and read various O1 and O2-related observability data and metrics through O1 and O2 related services. These third-party rApps can be leveraged in example embodiments to provide guidance and/or recommendations to the NFO and FOCOM for management, orchestration, and optimization of VNFs/CNFs and underlying O-Cloud infrastructure.

Example embodiments of the present disclosure provide a method and system for the SMO and O-Cloud to drain one or more O-Cloud Nodes based on recommendations from an rApp or manually by an O-Cloud Maintainer via the SMO. In particular, draining O-Cloud Node(s) will mark the O-Cloud Node(s) as cordoned, or unschedulable. Accordingly, it may necessitate the means to relocate, migrate, or terminate Network Functions or components of the Network Functions to another O-Cloud Node. According to embodiments, the request to drain the O-Cloud Node(s) may be based on a recommendation (for example, based on metric data). Accordingly, embodiments of the present disclosure may eliminate waste of O-cloud resources, as well as anticipate O-cloud Node failures and proactively manage O-Cloud resources accordingly.

Figure 2:
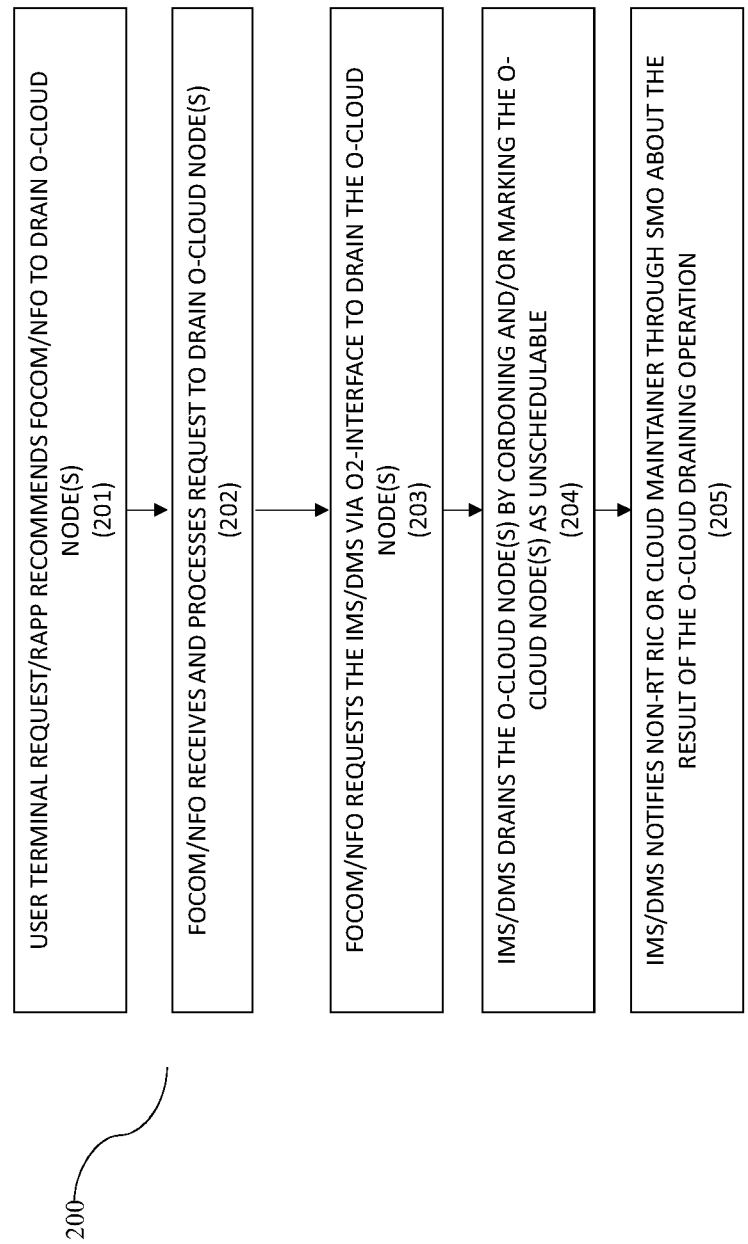
FIG. 2 is a flowchart of a method for draining an O-Cloud Node using an O2 interface between an SMO function and the O-Cloud according to an embodiment.

FIG. 2 is a flowchart of a method 200 for draining an O-Cloud Node according to an embodiment. One of the goals of method 200 may be to drain O-Cloud Node(s) by labelling the Node(s) as cordoned or un-schedulable, thereby safely evicting/migrating all the Network Function(s) and/or its components from the respective O-Cloud Node(s). The method of FIG. 2 at operation S201 may be performed by a user terminal of an O-Cloud Maintainer or an rApp (via Non-RT RIC), operations S202-S203 may be performed by the SMO function (e.g., NFO and/or FOCOM), and operations S204-S205 may be performed by the IMS/DMS. It should be appreciated that the O-Cloud Node(s) to be drained may be hosting a Network Function at the time of performing the method 200.

Referring to FIG. 2, the draining of an O-Cloud Node(s) may be initiated at operation S201 by the user terminal or the one or more rApps of the Non-RT RIC within the SMO. That is, the user terminal may manually provide a request, or the rApp may provide a recommendation to the FOCOM/NFO to drain the Node. According to embodiments, the rApp may be a hosted application by the Non-RT RIC in the SMO. The rApp may be from a third-party. The rApps may collect and read various O1 and O2-related observability data and metrics through O1 and O2 related services. Accordingly, the rApp may be used in some embodiments to provide guidance and-or recommendations to the NFO and FOCOM for management, orchestration, and optimization of VNFs and/or container network functions (CNFs) and underlying O-cloud infrastructure.

According to an embodiment, the rApp may use a data driven approach for providing recommendations to the SMO and/or O-cloud to drain an rApp based on the O1 and O2-related observability data and metrics. It should be appreciated that other data aside from O1 and O2 related observability data and metrics may be used in some embodiments for providing the recommendations. It should be appreciated that there are various scenarios in which there is a need to drain an O-cloud Node. One example scenario could be where an rApp, with the help of artificial intelligence and/or machine learning (AI/ML) can be used to provide insights to the FOCOM/NFO regarding O-Cloud failure. Accordingly, in some embodiments, artificial intelligence and/or or machine learning (AI/ML) may be used. The rApp may predict that O-Cloud Node failure will occur, and can accordingly recommend the FOCOM/NFO to drain the O-Cloud Node, thereby proactively migrating the workloads from the O-Cloud Node. During this NF migration, as a result of Node draining recommendation from the rApp, service continuity and quality of service may be ensured for the network, and overall disruptions may be minimized.

According to an embodiment, the SMO may be responsible for managing NF relocation. The SMO (FOCOM/NFO) may support the capability to receive recommendations to drain O-Cloud Node(s). The SMO may support the capability to send O-Cloud Node draining request to the O-Cloud (IMS/DMS) over O2 interface. The SMO may also support the capability to receive O-Cloud Node draining response from the O-Cloud (IMS/DMS) over O2 interface. The request for draining an O-Cloud Node(s) can be manual, or rApps can send a recommendation to FOCOM/NFO. Embodiments may implement a data-driven approach for optimizing O-Cloud resources. As previously mentioned, rApps in the non-RT RIC may utilize an AI/ML framework which may provide guidance to FOCOM/NFO in order to complement the FOCOM/NFO's scheduling capabilities, thereby empowering the system to make more data driven placement decisions.

Draining the O-Cloud Node(s) will mark the O-Cloud Node(s) as cordoned, or unschedulable. Accordingly, it may necessitate the means to relocate, migrate, or terminate Network Functions or components of the Network Functions to another O-Cloud Node. In some embodiments, draining the O-Cloud Node may include setting the O-Cloud Node to maintenance mode. It should also be appreciated that either the IMS or DMS may receive the request to drain the O-Cloud Node. It should also be appreciated that either the IMS or DMS may receive the request to drain the O-Cloud Node. Components of the O-RAN architecture in FIGS. 2, 3, and 4 may be similar to those according to FIG. 1. In other embodiments, a request to drain the Node may be sent by a user (e.g., the O-Cloud Maintainer) via a user terminal (e.g., including an application for managing network functions and/or subscribed to receive alarm events, notifications, etc., from the SMO).

Figure 3:
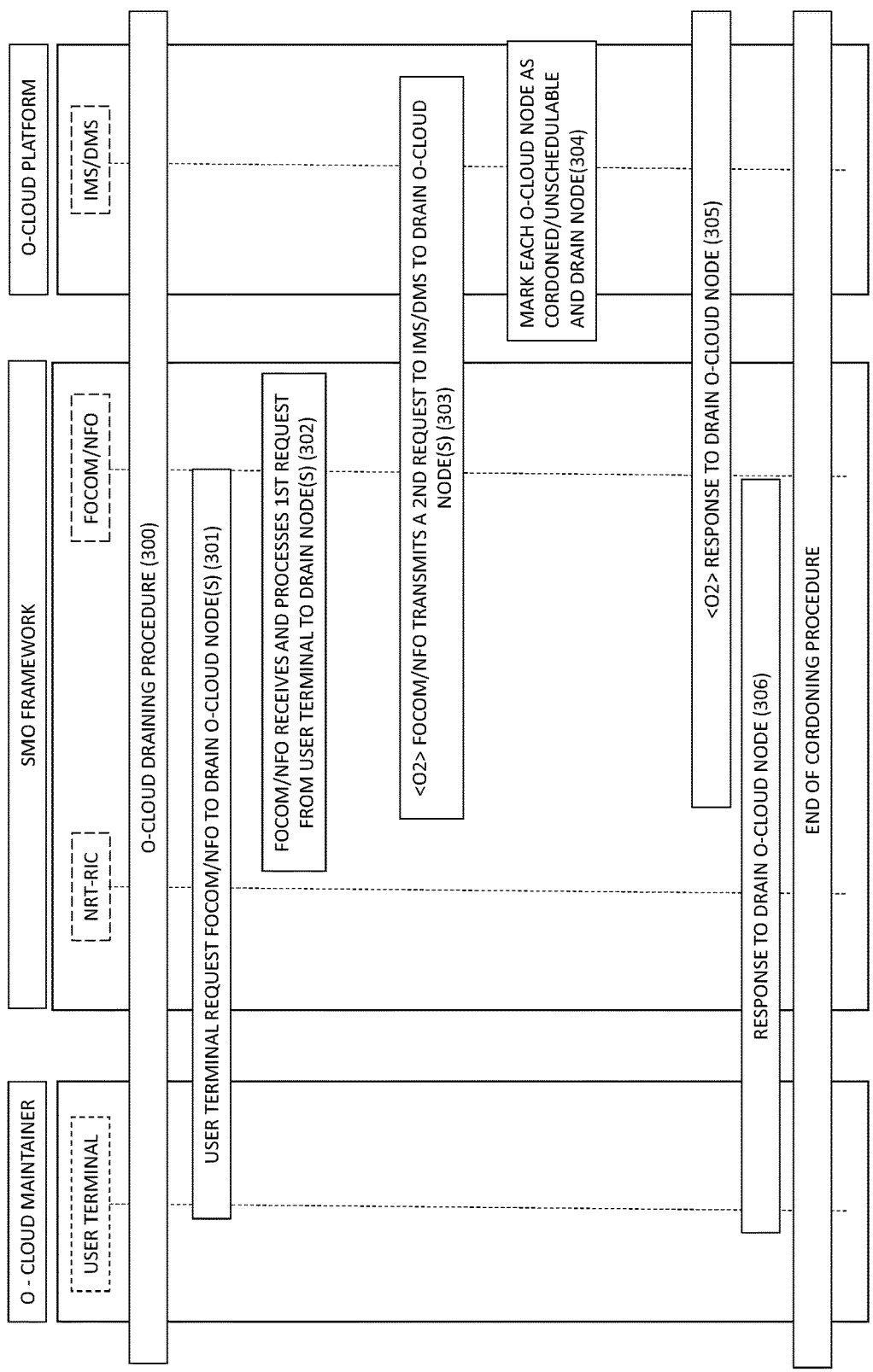
FIG. 3 is a diagram of an example environment in which systems described herein may be implemented for draining an O-Cloud Node based on a request from an O-Cloud Maintainer according to an embodiment.
Figure 4:
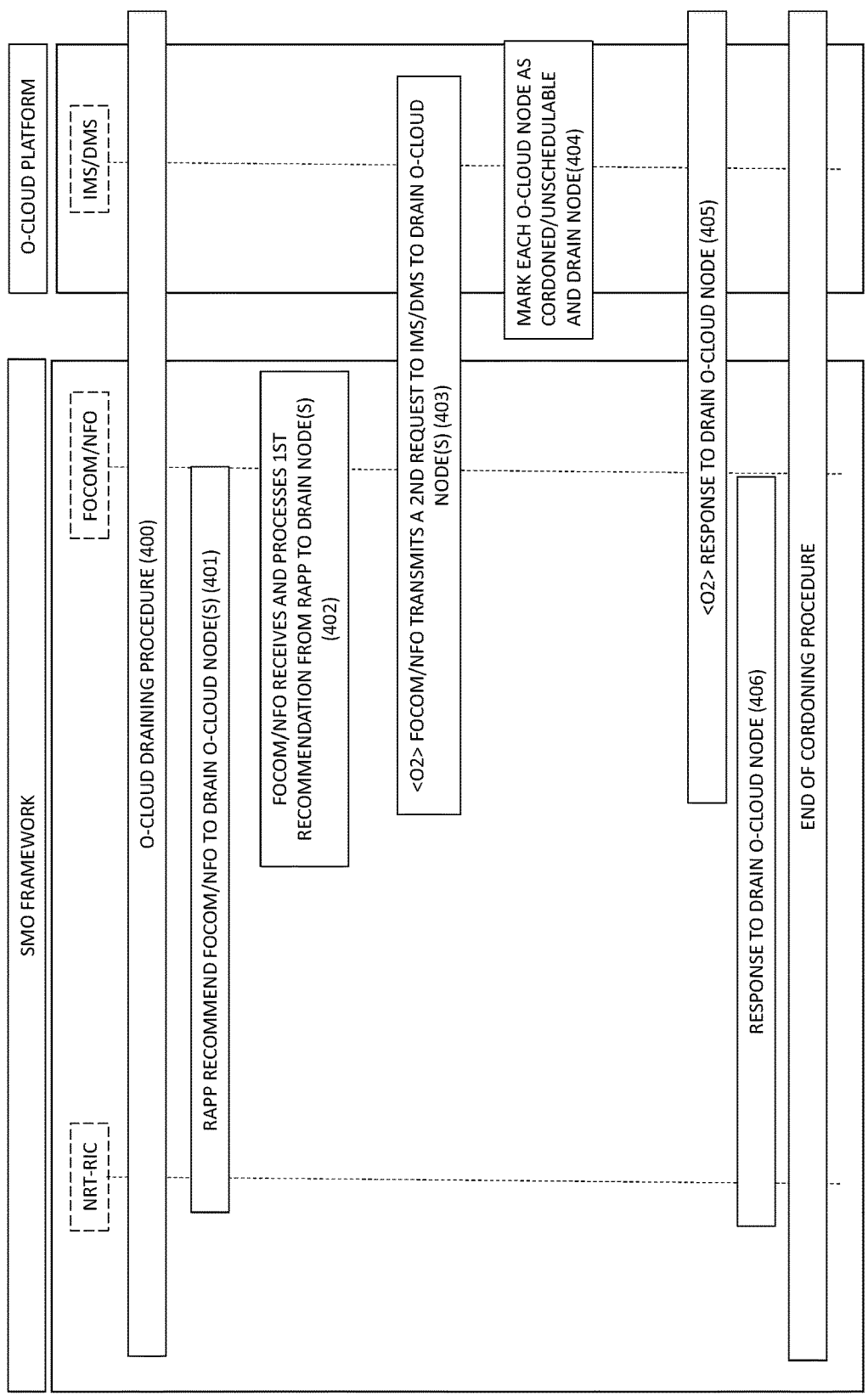
FIG. 4 is a diagram of an example environment in which systems described herein may be implemented for draining an O-Cloud Node based on a recommendation from an rApp according to an embodiment.

Prior to the commencement of draining of O-Cloud Node(s) as illustrated in FIGS. 2, 3, and 4, it may be assumed that the request to the SMO includes the identifiers (ID) of the O-Cloud Node to be drained. Draining a O-Cloud Node may be assumed to be based on a trigger received from the FOCOM/NFO based on a request from the O-Cloud Maintainer, or a recommendation from the rApp. It may also be assumed that the data traffic from the O-Cloud Node(s) which need to be drained has been moved or relocated prior to triggering a draining procedure. Further, according to some embodiments, According to some embodiments, the pre-requisites for triggering the request may include verifying that the SMO and the O-Cloud is available, and that O1 and O2 events have been subscribed by the monitoring system which may be supervised by the O-Cloud Maintainer and/or rApp. Accordingly, the process may proceed once the existing O-Cloud Node(s) are determined to be drained based on a request from the O-Cloud Maintainer or recommendation from rApp.

At operation S202, the FOCOM/NFO receives and processes the request or recommendation (first request) sent in operation S201 to drain the one or more O-Cloud Node(s). For example, the FOCOM/NFO may process the request or recommendation by implementing one or more logic to determine whether to accept the request or recommendation (e.g., logic including one or more thresholds, conditions, parameters, etc., to determine whether to request the IMS/DMS to drain the one or more O-Cloud Node(s) in response to the request/recommendation from the O-Cloud Maintainer and/or rApp). According to an embodiment, once the FOCOM/NFO receives the request, it may determine whether or not the request is valid (for instance, the FOCOM/NFO may determine whether the O-Cloud Node(s) which are requested to be drained can be drained).

At operation S203, the FOCOM/NFO requests (second request) the IMS/DMS to drain the one or more O-Cloud Nodes based on the received first request. Operation S203 may be performed once the recommendation from rApp or the request from the O-Cloud Maintainer to FOCOM/NFO gets accepted in operation S202. Here, the FOCOM/NFO may request the IMS/DMS to drain the one or more O-Cloud Nodes via the O2 interface, e.g., using O2ims services or O2dms services. Further, according to an embodiment, the FOCOM/NFO may request the IMS/DMS to drain the one or more O-Cloud Node(s) based on the processing of operation S202 (e.g., based on its internal logic determining to accept the request or recommendation). Alternatively, the process may end if the FOCOM/NFO determines in operation S202 not to accept the request/recommendation. According to another embodiment, the FOCOM/NFO may be configured to always grant the request or recommendation.

At operation S204 the IMS/DMS receives the request sent in operation S203 by the FOCOM/NFO, and performs an operation to mark the one or more O-Cloud Node(s) as cordoned or unschedulable, thereby draining said one or more O-Cloud Node(s). This may trigger migrating NF Deployment(s) from each individual O-Cloud Node.

At operation S205, the IMS/DMS may notify the FOCOM/NFO indicating that the status of the drain request, e.g. indicating that the cordon request is completed, or that an exception has occurred. The user terminal and/or the Non-RT RIC (i.e., rApp) may also receive this status update notification (e.g., the FOCOM/NFO in turn may notify the O-Cloud Maintainer or rApp).

Operations S203, S204, and S205 may be looped or repeatedly performed for each of the one or more O-Cloud Nodes identified in the first request. Further, the FOCOM/NFO may determine an order for draining the one or more O-Cloud Nodes according to a predetermined criterion or randomly, and may transmit the second requests respectively corresponding to the one or more O-Cloud Nodes in accordance with this determined order. Once the O-Cloud Node(s) is drained, all the NF Deployments(s) are either migrated or terminated from the O-Cloud Node(s).

FIG. 3 illustrates a detailed method for implementing a draining procedure 300 of O-Cloud Node(s) according to an embodiment, wherein the user terminal O-Cloud Maintainer sends the request. The method of FIG. 3 may be requested manually by a user via a user terminal (i.e., application installed therein) The method may be performed using a FOCOM/NFO and IMS/DMS, similar to the embodiment illustrated in FIG. 2 above.

In operation 301, the user terminal (the O-Cloud Maintainer) sends a first request to the FOCOM/NFO to drain the O-Cloud Node(s). The first request may include an identifier of the O-Cloud Node(s). This may be similar to operation S201 described in FIG. 2 above.

In operation 302, the FOCOM/NFO receives and processes the first request from the user terminal to drain the O-Cloud Node(s). This may be similar to operation S202 described in FIG. 2 above.

In operation 303, the FOCOM/NFO via the O2 interface sends a second request to the IMS/DMS to drain the O-Cloud Node(s) based on the received first request. This may be similar to operation S203 described in FIG. 2 above.

In operation 304, the IMS/DMS drains each specified Node by cordoning or marking the O-Cloud Node(s) as unschedulable. To this end, the IMS/DMS may mark the O-Cloud Node as "unschedulable", so that the scheduler in the SMO will not instantiate any new deployments (i.e., network functions) on the O-Cloud Node. This may be similar to operation S204 described in FIG. 2 above.

In operation 305, in an example embodiment, the IMS/DMS sends a notification regarding the status of the draining procedure to the FOCOM/NFO via the O2 interface. This may either indicate that the draining procedure was completed successfully, or that an exception occurred. It should be appreciated that in the event that the notification indicates that the draining procedure was completed successfully, it may indicate that the requested O-Cloud Node(s) in the Node Cluster has been marked cordoned or un-schedulable, and all the NF Deployment(s) are migrated to other O-Cloud Node(s) within the Node Cluster.

According to embodiments, exception handling can be implemented. Accordingly, if there was an exception that occurred since the drain procedure encountered an exception (which may include, but is not limited to, the Node cluster not being found, the Node cluster not responding, or the Node cluster being unavailable, or the Node cluster having insufficient resources to migrate NF deployments) the IMS/DMS, may notify the FOCOM/NFO that the O-Cloud Node(s) drain procedure was unsuccessful. In this case, the notification may indicate that the O-Cloud and IMS/DMS state is in the same state as before the request arrived: no resources are amended, and no NF Deployment(s) are migrated or terminated.

In operation 306, the IMS/DMS may also (or alternatively) send the notification from operation 305 to the user terminal (application), for example, based on whether they are subscribed to notifications from the IMS/DMS. Operations 305 and 306 may be similar to operation S205 described in FIG. 2 above.

In an embodiment, Operations 303 through 306 may be looped or repeatedly performed for each of the one or more O-Cloud Nodes identified in the first request.

Once the O-Cloud Node(s) have been drained, i.e., when the O-Cloud Node(s) have been marked as cordoned or un-schedulable, and the NF deployment(s) have been moved to other O-Cloud Node instances, or the method has encountered an exception, the process may end.

It should be appreciated that the method may be considered as successful if the requested O-Cloud Node(s) in the Node Cluster has been marked cordoned or un-schedulable, and all the NF Deployment(s) are migrated to other O-Cloud Node(s) within the Node Cluster.

Alternatively, the method may be considered to have failed or encountered an error if the O-Cloud and IMS/DMS state is in the same state as before the request arrived: no resources are amended, and no NF Deployment(s) are migrated or terminated.

FIG. 4 illustrates a detailed method for implementing a draining procedure 300 of O-Cloud Node(s) according to an embodiment, wherein a recommendation is sent from an rApp. The method of FIG. 4 may be based on a recommendation from the Non-RT RIC (rApp). The method may be performed using a FOCOM/NFO and IMS/DMS, similar to the embodiment illustrated in FIG. 2 above.

In operation 401, the rApp (Non-RT RIC) sends a first recommendation to the FOCOM/NFO to drain the O-Cloud Node(s). The first recommendation may include an identifier of the O-Cloud Node(s). This may be similar to operation S201 described in FIG. 2 above in the case where the NON-RT RIC rApp sends a recommendation.

In operation 402, the FOCOM/NFO receives and processes the first recommendation from the Non-RT RIC to drain the O-Cloud Node(s). This may be similar to operation S202 described in FIG. 2 above.

In operation 403, the FOCOM/NFO via the O2 interface sends a second request to the IMS/DMS to drain the O-Cloud Node(s) based on the received first recommendation. This may be similar to operation S203 described in FIG. 2 above.

In operation 404, the IMS/DMS drains each specified Node by cordoning or marking the O-Cloud Node(s) as unschedulable. To this end, the IMS/DMS may mark the O-Cloud Node as "unschedulable", so that the scheduler in the SMO will not instantiate any new deployments (i.e., network functions) on the O-Cloud Node. This may be similar to operation S204 described in FIG. 2 above.

In operation 405, in an example embodiment, the IMS/DMS sends a notification regarding the status of the draining procedure to the FOCOM/NFO via the O2 interface. This may either indicate that the draining procedure was completed successfully, or that an exception occurred. It should be appreciated that in the event that the notification indicates that the draining procedure was completed successfully, it may indicate that the requested O-Cloud Node(s) in the Node Cluster has been marked cordoned or un-schedulable, and all the NF Deployment(s) are migrated to other O-Cloud Node(s) within the Node Cluster.

According to embodiments, exception handling can be implemented. Accordingly, if there was an exception that occurred since the drain procedure encountered an exception (which may include, but is not limited to, the Node cluster not being found, the Node cluster not responding, or the Node cluster being unavailable, or the Node cluster having insufficient resources to migrate NF deployments) the IMS/DMS, may notify the FOCOM/NFO that the O-Cloud Node(s) drain procedure was unsuccessful. In this case, the notification may indicate that the O-Cloud and IMS/DMS state is in the same state as before the request arrived: no resources are amended, and no NF Deployment(s) are migrated or terminated.

In operation 406, the IMS/DMS may also (or alternatively) send the notification from operation 405 to the Non-RT RIC (rApp), for example, based on whether they are subscribed to notifications from the IMS/DMS. Operations 405 and 406 may be similar to operation S405 described in FIG. 2 above.

In an embodiment, Operations 403 through 406 may be looped or repeatedly performed for each of the one or more O-Cloud Nodes identified in the first request.

Based on the above, it can be understood that O-Cloud Node(s) can be drained based on a request from a user terminal or based on a recommendation from an rApp based on metric data (or other data). Accordingly, it may necessitate the means to relocate, migrate, or terminate Network Functions or components of the Network Functions to another O-Cloud Node. Accordingly, embodiments of the present disclosure may eliminate waste of O-cloud resources, as well as anticipate O-cloud Node failures and proactively manage O-Cloud resources accordingly.

Figure 5:
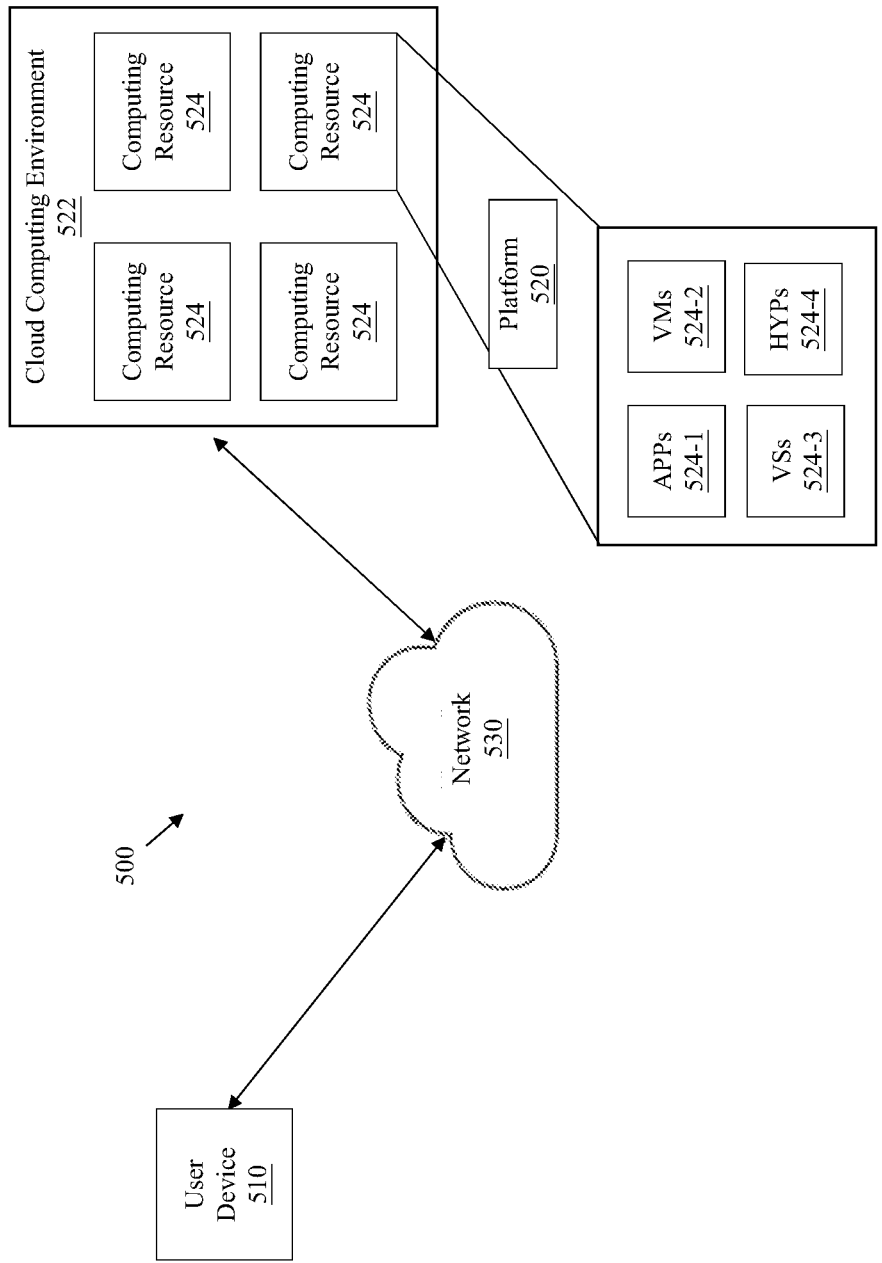
FIG. 5 is a diagram of an example environment in which systems and/or methods, described herein, may be implemented.

FIG. 5 is a diagram of an example environment 500 in which systems and/or methods, described herein, may be implemented. As shown in FIG. 5, environment 500 may include a user device 510, a platform 520, and a network 530. Devices of environment 500 may interconnect via wired connections, wireless connections, or a combination of wired and wireless connections. In embodiments, any of the functions and operations described with reference to FIGS. 2 through 4 above may be performed by any combination of elements illustrated in FIG. 5.

User device 510 includes one or more devices capable of receiving, generating, storing, processing, and/or providing information associated with platform 520. For example, user device 510 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 510 may receive information from and/or transmit information to platform 520.

Platform 520 includes one or more devices capable of receiving, generating, storing, processing, and/or providing information. In some implementations, platform 520 may include a cloud server or a group of cloud servers. In some implementations, platform 520 may be designed to be modular such that certain software components may be swapped in or out depending on a particular need. As such, platform 520 may be easily and/or quickly reconfigured for different uses.

In some implementations, as shown, platform 520 may be hosted in cloud computing environment 522. Notably, while implementations described herein describe platform 520 as being hosted in cloud computing environment 522, in some implementations, platform 520 may not be cloud-based (i.e., may be implemented outside of a cloud computing environment) or may be partially cloud-based.

Cloud computing environment 522 includes an environment that hosts platform 520. Cloud computing environment 522 may provide computation, software, data access, storage, etc., services that do not require end-user (e.g., user device 510) knowledge of a physical location and configuration of system(s) and/or device(s) that hosts platform 520. As shown, cloud computing environment 522 may include a group of computing resources 524 (referred to collectively as "computing resources 524" and individually as "computing resource 524").

Computing resource 524 includes one or more personal computers, a cluster of computing devices, workstation computers, server devices, or other types of computation and/or communication devices. In some implementations, computing resource 524 may host platform 520. The cloud resources may include compute instances executing in computing resource 524, storage devices provided in computing resource 524, data transfer devices provided by computing resource 524, etc. In some implementations, computing resource 524 may communicate with other computing resources 524 via wired connections, wireless connections, or a combination of wired and wireless connections.

As further shown in FIG. 5, computing resource 524 includes a group of cloud resources, such as one or more applications ("APPs") 524-1, one or more virtual machines ("VMs") 524-2, virtualized storage ("VSs") 524-3, one or more hypervisors ("HYPs") 524-4, or the like.

Application 524-1 includes one or more software applications that may be provided to or accessed by user device 510. Application 524-1 may eliminate a need to install and execute the software applications on user device 510. For example, application 524-1 may include software associated with platform 520 and/or any other software capable of being provided via cloud computing environment 522. In some implementations, one application 524-1 may send/receive information to/from one or more other applications 524-1, via virtual machine 524-2.

Virtual machine 524-2 includes a software implementation of a machine (e.g., a computer) that executes programs like a physical machine. Virtual machine 524-2 may be either a system virtual machine or a process virtual machine, depending upon use and degree of correspondence to any real machine by virtual machine 524-2. A system virtual machine may provide a complete system platform that supports execution of a complete operating system ("OS"). A process virtual machine may execute a single program, and may support a single process. In some implementations, virtual machine 524-2 may execute on behalf of a user (e.g., user device 510), and may manage infrastructure of cloud computing environment 522, such as data management, synchronization, or long-duration data transfers.

Virtualized storage 524-3 includes one or more storage systems and/or one or more devices that use virtualization techniques within the storage systems or devices of computing resource 524. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 524-4 may provide hardware virtualization techniques that allow multiple operating systems (e.g., "guest operating systems") to execute concurrently on a host computer, such as computing resource 524. Hypervisor 524-4 may present a virtual operating platform to the guest operating systems, and may manage the execution of the guest operating systems. Multiple instances of a variety of operating systems may share virtualized hardware resources.

Network 530 includes one or more wired and/or wireless networks. For example, network 530 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
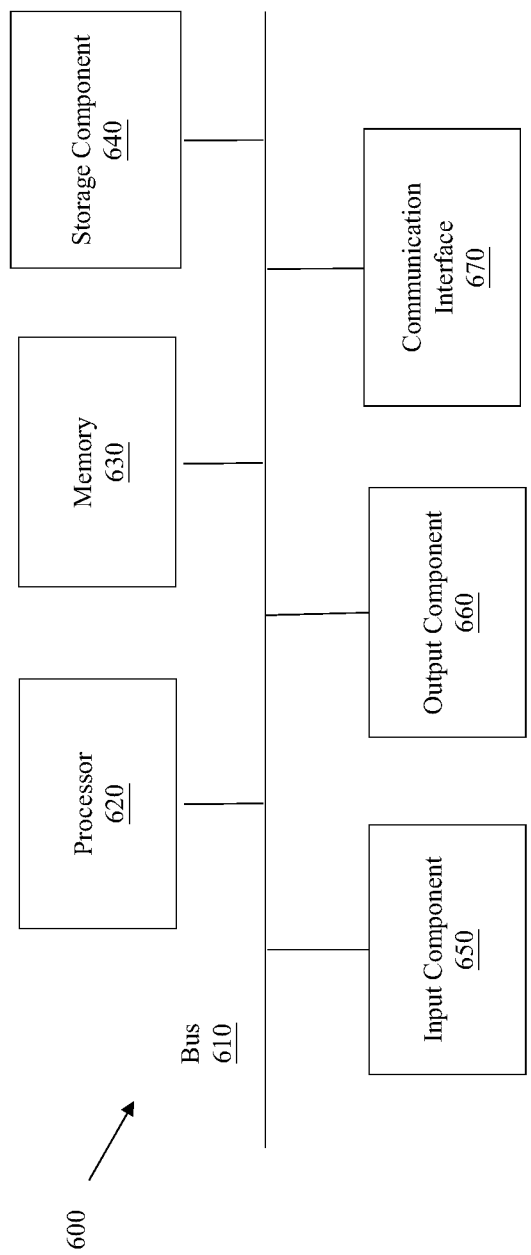
FIG. 6 is a diagram of example components of a device according to an embodiment.

FIG. 6 is a diagram of example components of a device 600. Device 600 may correspond to user device 510 and/or platform 520. As shown in FIG. 6, device 600 may include a bus 610, a processor 620, a memory 630, a storage component 640, an input component 650, an output component 660, and a communication interface 670.

Bus 610 includes a component that permits communication among the components of device 600. Processor 620 may be implemented in hardware, firmware, or a combination of hardware and software. Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 650 includes a component that permits device 600 to receive information, such as via user input (e.g., a touch screen display, a keyboard, a keypad, a mouse, a button, a switch, and/or a microphone). Additionally, or alternatively, input component 650 may include a sensor for sensing information (e.g., a global positioning system (GPS) component, an accelerometer, a gyroscope, and/or an actuator). Output component 660 includes a component that provides output information from device 600 (e.g., a display, a speaker, and/or one or more light-emitting diodes (LEDs)).

Communication interface 670 includes a transceiver-like component (e.g., a transceiver and/or a separate receiver and transmitter) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, or the like.

Device 600 may perform one or more processes described herein. Device 600 may perform these processes in response to processor 620 executing software instructions stored by a non-transitory computer-readable medium, such as memory 630 and/or storage component 640. A computer-readable medium is defined herein as a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

In embodiments, any of the operations or processes of FIGS. 2-4 may be implemented by or using any one of the elements illustrated in FIGS. 5 and 6. It is understood that other embodiments are not limited thereto, and may be implemented in a variety of different architectures (e.g., bare metal architecture, any cloud-based architecture or deployment architecture such as Kubernetes, Docker, OpenStack, etc.).

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

These computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Various Aspects of Embodiments

Various further respective aspects and features of embodiments of the present disclosure may be defined by the following items:

Item [1]: A method for draining one or more Open Radio Access Network (O-RAN) Cloud (O-Cloud) Nodes, the method comprising: receiving, by a Service Management and Orchestration Framework (SMO) function, a first request or recommendation to drain at least one O-Cloud Node, the first request or recommendation being received from an rApp of a Non-Real-Time (Non-RT) RAN Intelligent Controller (RIC) or from an O-Cloud Maintainer; transmitting, by the SMO function to an Infrastructure Management Services (IMS) and/or Deployment Management Services (DMS) via an O2 interface, a second request to drain the at least one O-Cloud Node based on the received first request or recommendation; and receiving, from the IMS/DMS, a first notification as to whether the at least one O-Cloud Node has been drained, wherein the SMO function is at least one of a Federated O-Cloud Orchestration and Management (FOCOM) and Network Function Orchestration (NFO).

Item [2] The method according to item [1], wherein the second request is an instruction to drain a first O-Cloud Node of the at least one O-Cloud Node, wherein the first notification indicates that the first O-Cloud Node has been drained, and wherein the method further comprises: transmitting, by the SMO function to the IMS/DMS via the O2 interface, a third request to drain a second O-Cloud Node of the at least one O-Cloud Node based on the received first request or recommendation.

Item [3] The method according to any one of items [1]-[2] wherein the first request or recommendation is based on metric and/or observability data received by the rApp or the O-Cloud Maintainer via O1- and/or O2-related services.

Item [4] The method according to any one of items [1]-[3], wherein the second request is transmitted by the SMO function to the IMS/DMS based on determining, by the SMO function, to accept the first request or recommendation to drain the at least one O-Cloud Node.

Item [5] The method according to any one of items [1]-[4], wherein the first notification indicates that the at least one O-Cloud Node was not drained or an exception occurred.

Item [6] The method according to any one of items [1]-[5], wherein the first notification indicates that the at least one O-Cloud Node was drained, and wherein the receiving the first notification comprises: receiving, from the IMS/DMS by the SMO function via the O2 interface, the first notification that the at least one O-Cloud Node has been drained.

Item [7] The method according to item [6], further comprising: notifying, by the SMO function, the rApp of the Non-RT RIC or the O-Cloud Maintainer that the at least one O-Cloud Node has been drained.

Item [8] An apparatus for draining one or more Open Radio Access Network (O-RAN) Cloud (O-Cloud) Nodes, the apparatus comprising: at least one memory storing computer-executable instructions; and at least one processor configured to execute the computer-executable instructions to: receive, by a Service Management and Orchestration Framework (SMO) function, a first request or recommendation to drain at least one O-Cloud Node, the first request or recommendation being received from an rApp of a Non-Real-Time (Non-RT) RAN Intelligent Controller (RIC) or from an O-Cloud Maintainer; transmit, by the SMO function to an Infrastructure Management Services (IMS) and/or Deployment Management Services (DMS) via an O2 interface, a second request to drain the at least one O-Cloud Node based on the received first request or recommendation; and receive, from the IMS/DMS, a first notification as to whether the at least one O-Cloud Node has been drained, wherein the SMO function is at least one of a Federated O-Cloud Orchestration and Management (FOCOM) and Network Function Orchestration (NFO).

Item [9] The apparatus according to item [8], wherein the second request is an instruction to drain a first O-Cloud Node of the at least one O-Cloud Node, wherein the first notification indicates that the first O-Cloud Node has been drained, and wherein the at least one processor is further configured to execute the computer-executable instructions to: transmit, by the SMO function to the IMS/DMS via the O2 interface, a third request to drain a second O-Cloud Node of the at least one O-Cloud Node based on the received first request or recommendation.

Item [10] The apparatus according to any one of items [8]-[9], wherein the first request or recommendation is based on metric and/or observability data received by the rApp or the O-Cloud Maintainer via O1- and/or O2-related services.

Item [11] The apparatus according to any one of items [8]-[10], wherein the second request is transmitted by the SMO function to the IMS/DMS based on determining, by the SMO function, to accept the first request or recommendation to drain the at least one O-Cloud Node.

Item [12] The apparatus according to any one of items [8]-[11], wherein the first notification indicates that the at least one O-Cloud Node was not drained or an exception occurred.

Item [13] The according to any one of items [8]-[12], wherein the first notification indicates that the at least one O-Cloud Node was drained, and wherein the at least one processor is further configured to execute the computer-executable instructions to receive the first notification by: receiving, from the IMS/DMS by the SMO function via the O2 interface, the first notification that the at least one O-Cloud Node has been drained.

Item [14] The apparatus according to item [13], wherein the at least one processor is further configured to execute the computer-executable instructions to: notifying, by the SMO function, the rApp of the Non-RT RIC or the O-Cloud Maintainer that the at least one O-Cloud Node has been drained.

Item [15] A non-transitory computer-readable recording medium having recorded thereon instructions executable by at least one processor to cause the processor to perform a method comprising: receiving, by a Service Management and Orchestration Framework (SMO) function, a first request or recommendation to drain at least one O-Cloud Node, the first request or recommendation being received from an rApp of a Non-Real-Time (Non-RT) RAN Intelligent Controller (RIC) or from an O-Cloud Maintainer; transmitting, by the SMO function to an Infrastructure Management Services (IMS) and/or Deployment Management Services (DMS) via an O2 interface, a second request to drain the at least one O-Cloud Node based on the received first request or recommendation; and receiving, from the IMS/DMS, a first notification as to whether the at least one O-Cloud Node has been drained, wherein the SMO function is at least one of a Federated O-Cloud Orchestration and Management (FOCOM) and Network Function Orchestration (NFO).

Item [16] The non-transitory computer-readable recording medium according to item [15], wherein the second request is an instruction to drain a first O-Cloud Node of the at least one O-Cloud Node, wherein the first notification indicates that the first O-Cloud Node has been drained, and wherein the method further comprises: transmitting, by the SMO function to the IMS/DMS via the O2 interface, a third request to drain a second O-Cloud Node of the at least one O-Cloud Node based on the received first request or recommendation.

Item [17] The non-transitory computer-readable recording medium according to any one of items [15]-[16], wherein the first request or recommendation is based on metric and/or observability data received by the rApp or the O-Cloud Maintainer via O1- and/or O2-related services.

Item [18] The non-transitory computer-readable recording medium according to any one of items [15]-[17], wherein the second request is transmitted by the SMO function to the IMS/DMS based on determining, by the SMO function, to accept the first request or recommendation to drain the at least one O-Cloud Node.

Item [19] The non-transitory computer-readable recording medium according to any one of items [15]-[18], wherein the first notification indicates that the at least one O-Cloud Node was not drained or an exception occurred.

Item [20] The non-transitory computer-readable recording medium according to any one of items [15]-[19], wherein the first notification indicates that the at least one O-Cloud Node was drained, and wherein the receiving the first notification comprises: receiving, from the IMS/DMS by the SMO function via the O2 interface, the first notification that the at least one O-Cloud Node has been drained.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A method for draining one or more Open Radio Access Network (O-RAN) Cloud (O-Cloud) Nodes, the method comprising:
    receiving, by a Service Management and Orchestration Framework (SMO) function, a first request or recommendation to drain at least one O-Cloud Node, the first request or recommendation being received from an rApp of a Non-Real-Time (Non-RT) RAN Intelligent Controller (RIC) or from an O-Cloud Maintainer, wherein draining the at least one O-Cloud Node comprises at least one of: migrating network functions or components of the network functions to another O-Cloud Node, relocating the network functions or the components of the network functions to another O-Cloud Node, or terminating all the network functions or all the components of the network functions of the O-Cloud Node;
    transmitting, by the SMO function to an Infrastructure Management Services (IMS) and/or Deployment Management Services (DMS) via an O2 interface, a second request to drain the at least one O-Cloud Node based on the received first request or recommendation; and
    receiving, from the IMS/DMS, a first notification as to whether the at least one O-Cloud Node has been drained,
    wherein the SMO function is at least one of a Federated O-Cloud Orchestration and Management (FOCOM) and Network Function Orchestration (NFO).

2. The method as claimed in claim 1, wherein the second request is an instruction to drain a first O-Cloud Node of the at least one O-Cloud Node, wherein the first notification indicates that the first O-Cloud Node has been drained, and wherein the method further comprises:
    transmitting, by the SMO function to the IMS/DMS via the O2 interface, a third request to drain a second O-Cloud Node of the at least one O-Cloud Node based on the received first request or recommendation.

3. The method as claimed in claim 1, wherein the first request or recommendation is based on metric and/or observability data received by the rApp or the O-Cloud Maintainer via O1- and/or O2-related services.

4. The method as claimed in claim 1, wherein the second request is transmitted by the SMO function to the IMS/DMS based on determining, by the SMO function, to accept the first request or recommendation to drain the at least one O-Cloud Node.

5. The method as claimed in claim 1, wherein the first notification indicates that the at least one O-Cloud Node was not drained or an exception occurred.

6. The method as claimed in claim 1, wherein the first notification indicates that the at least one O-Cloud Node was drained, and wherein the receiving the first notification comprises:
    receiving, from the IMS/DMS by the SMO function via the O2 interface, the first notification that the at least one O-Cloud Node has been drained.

7. The method as claimed in claim 6, further comprising:
    notifying, by the SMO function, the rApp of the Non-RT RIC or the O-Cloud Maintainer that the at least one O-Cloud Node has been drained.

8. The method as claimed in claim 1, wherein the draining the at least one O-Cloud Node further comprises at least one of: marking the at least one O-Cloud Node as unschedulable and setting the at least one O-Cloud Node to a maintenance mode.

9. The method as claimed in claim 1, wherein the first request or recommendation includes an identifier of the at least one O-Cloud Node to be drained.

10. An apparatus for draining one or more Open Radio Access Network (O-RAN) Cloud (O-Cloud) Nodes, the apparatus comprising:
    at least one memory storing computer-executable instructions; and
    at least one processor configured to execute the computer-executable instructions to:
    receive, by a Service Management and Orchestration Framework (SMO) function, a first request or recommendation to drain at least one O-Cloud Node, the first request or recommendation being received from an rApp of a Non-Real-Time (Non-RT) RAN Intelligent Controller (RIC) or from an O-Cloud Maintainer, wherein draining the at least one O-Cloud Node comprises at least one of: migrating network functions or components of the network functions to another O-Cloud Node, relocating the network functions or the components of the network functions to another O-Cloud Node, or terminating all the network functions or all the components of the network functions of the O-Cloud Node;
    transmit, by the SMO function to an Infrastructure Management Services (IMS) and/or Deployment Management Services (DMS) via an O2 interface, a second request to drain the at least one O-Cloud Node based on the received first request or recommendation; and
    receive, from the IMS/DMS, a first notification as to whether the at least one O-Cloud Node has been drained,
    wherein the SMO function is at least one of a Federated O-Cloud Orchestration and Management (FOCOM) and Network Function Orchestration (NFO).

11. The apparatus as claimed in claim 10, wherein the second request is an instruction to drain a first O-Cloud Node of the at least one O-Cloud Node, wherein the first notification indicates that the first O-Cloud Node has been drained, and wherein the at least one processor is further configured to execute the computer-executable instructions to:
    transmit, by the SMO function to the IMS/DMS via the O2 interface, a third request to drain a second O-Cloud Node of the at least one O-Cloud Node based on the received first request or recommendation.

12. The apparatus as claimed in claim 10, wherein the first request or recommendation is based on metric and/or observability data received by the rApp or the O-Cloud Maintainer via O1- and/or O2-related services.

13. The apparatus as claimed in claim 10, wherein the second request is transmitted by the SMO function to the IMS/DMS based on determining, by the SMO function, to accept the first request or recommendation to drain the at least one O-Cloud Node.

14. The apparatus as claimed in claim 10, wherein the first notification indicates that the at least one O-Cloud Node was not drained or an exception occurred.

15. The apparatus as claimed in claim 10, wherein the first notification indicates that the at least one O-Cloud Node was drained, and wherein the at least one processor is further configured to execute the computer-executable instructions to receive the first notification by:
    receiving, from the IMS/DMS by the SMO function via the O2 interface, the first notification that the at least one O-Cloud Node has been drained.

16. The apparatus as claimed in claim 15, wherein the at least one processor is further configured to execute the computer-executable instructions to:
notifying, by the SMO function, the rApp of the Non-RT RIC or the O-Cloud Maintainer that the at least one O-Cloud Node has been drained.

17. A non-transitory computer-readable recording medium having recorded thereon instructions executable by at least one processor to cause the processor to perform a method comprising:
receiving, by a Service Management and Orchestration Framework (SMO) function, a first request or recommendation to drain at least one O-Cloud Node, the first request or recommendation being received from an rApp of a Non-Real-Time (Non-RT) RAN Intelligent Controller (RIC) or from an O-Cloud Maintainer, wherein draining the at least one O-Cloud Node comprises at least one of: migrating network functions or components of the network functions to another O-Cloud Node, relocating the network functions or the components of the network functions to another O-Cloud Node, or terminating all the network functions or all the components of the network functions of the O-Cloud Node;
transmitting, by the SMO function to an Infrastructure Management Services (IMS) and/or Deployment Management Services (DMS) via an O2 interface, a second request to drain the at least one O-Cloud Node based on the received first request or recommendation; and
receiving, from the IMS/DMS, a first notification as to whether the at least one O-Cloud Node has been drained,
wherein the SMO function is at least one of a Federated O-Cloud Orchestration and Management (FOCOM) and Network Function Orchestration (NFO).

18. The non-transitory computer-readable recording medium as claimed in claim 17, wherein the second request is an instruction to drain a first O-Cloud Node of the at least one O-Cloud Node, wherein the first notification indicates that the first O-Cloud Node has been drained, and wherein the method further comprises:
transmitting, by the SMO function to the IMS/DMS via the O2 interface, a third request to drain a second O-Cloud Node of the at least one O-Cloud Node based on the received first request or recommendation.

19. The non-transitory computer-readable recording medium as claimed in claim 17, wherein the first request or recommendation is based on metric and/or observability data received by the rApp or the O-Cloud Maintainer via O1- and/or O2-related services.

20. The non-transitory computer-readable recording medium as claimed in claim 17, wherein the second request is transmitted by the SMO function to the IMS/DMS based on determining, by the SMO function, to accept the first request or recommendation to drain the at least one O-Cloud Node.

* * * * *